UNITED STATES PATENT OFFICE.

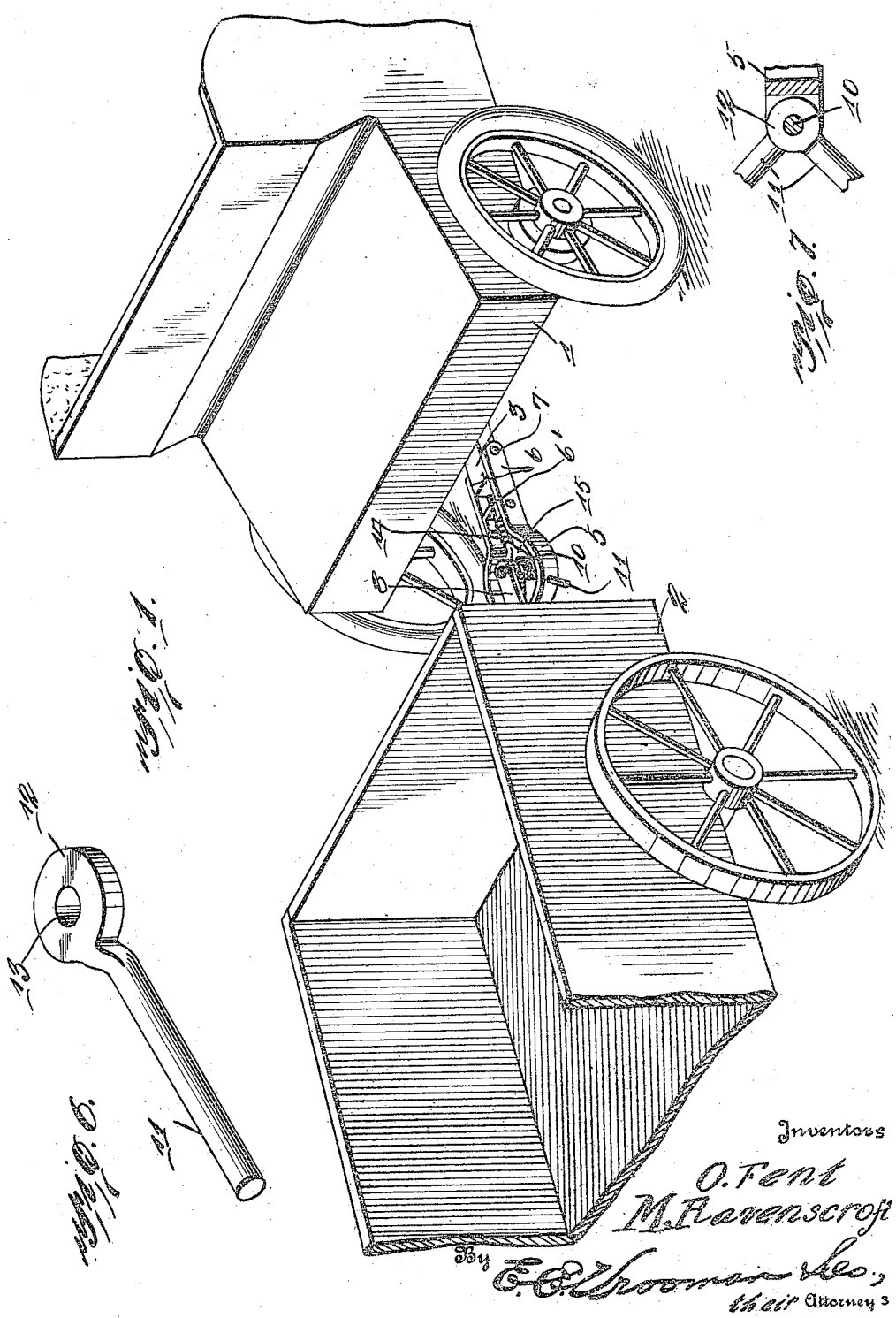

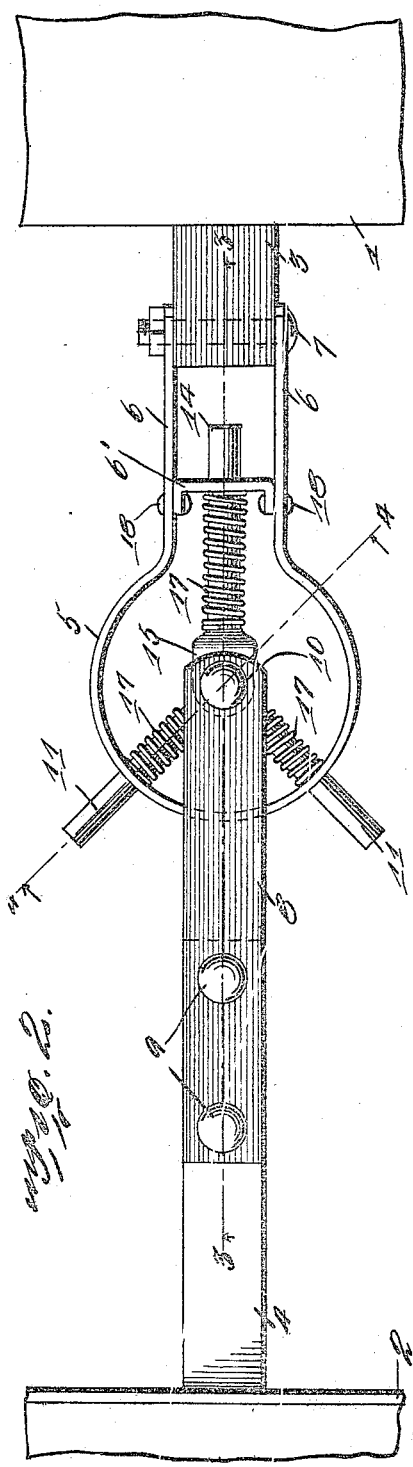
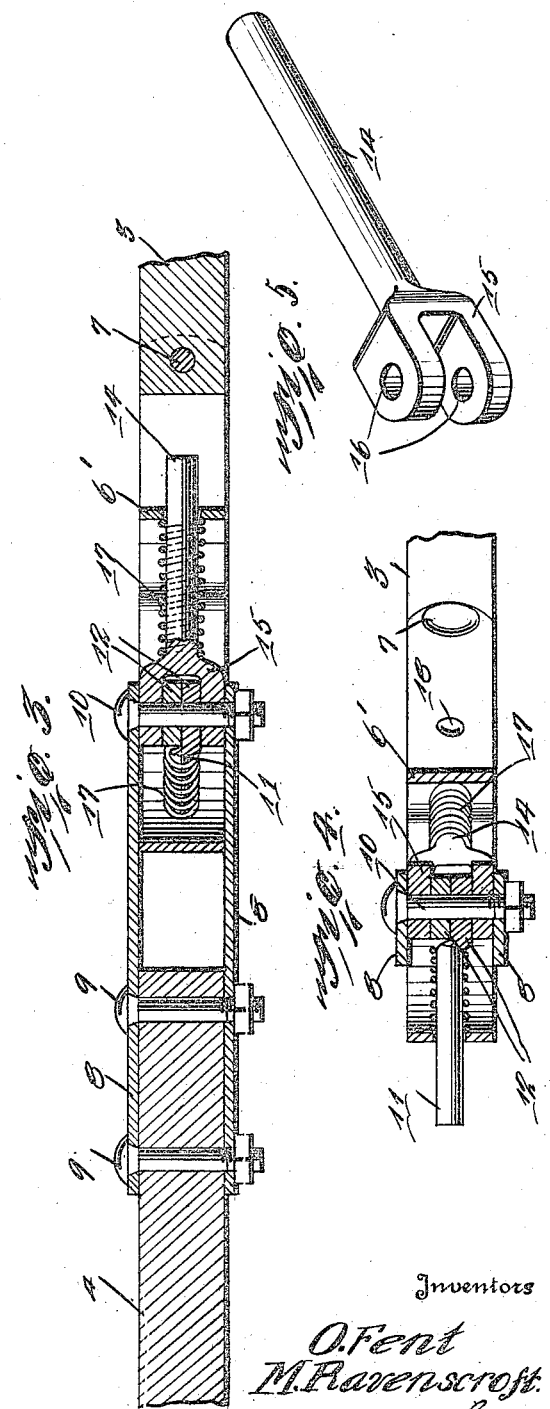

OSCAR FENT AND MASON RAVENSCROFT, OF NEWTON, KANSAS.

SHOCK-ABSORBER FOR AUTOMOBILE-TRAILERS.

1,267,318.

Specification of Letters Patent.

Patented May 21, 1918.

Application filed May 29, 1917. Serial No. 171,743.

*To all whom it may concern:*

Be it known that we, OSCAR FENT and MASON RAVENSCROFT, citizens of the United States of America, residing at Newton, in the county of Harvey and State of Kansas, have invented certain new and useful Improvements in Shock-Absorbers for Automobile-Trailers, of which the following is a specification, reference being had therein to the accompanying drawing.

This invention relates to shock absorbers for automobile trailers and has for its principal object the production of a simple and efficient means for coupling a trailer to an automobile in such a manner as to permit the automobile to draw the trailer and also so as to stop the same very easily with the shock being absorbed.

Another object of this invention is the production of a shock absorber for automobile trailers wherein a frame is provided upon which a number of spring-operated stems are slidably mounted so as to cause the shock occasioned by either the starting or stopping of the trailer by the automobile to be eliminated.

With these and other objects in view this invention consists in general of certain novel combinations, constructions and arrangements of parts which will be hereinafter fully described and claimed.

In the drawings:

Figure 1 is a detail perspective view of the shock absorber for automobile trailers showing the same in use.

Fig. 2 is a top plan view of the shock absorber for automobile trailers.

Fig. 3 is a longitudinal section taken on the line 3—3 of Fig. 2 looking in the direction of the arrows.

Fig. 4 is a section taken on the line 4—4 of Fig. 2 looking in the direction of the arrows.

Fig. 5 is a detail perspective view of the forwardly-extending stem.

Fig. 6 is a detail perspective view of one of the rearwardly-extending stems.

Fig. 7 is a sectional view through the bolt illustrating the manner in which the stems are connected thereto.

Referring to the accompanying drawings by numerals it will be seen that the device is adapted to be used in connection with an automobile 1 and a trailer 2. A beam or bar 3 extends rearwardly from the automobile 1 while a bar 4 extends forwardly from the trailer 2.

The frame of the shock absorber comprises a substantially circular body 5 having forwardly-extending spaced sides 6 as shown clearly in Fig. 2. The forward ends of the sides 6 fit upon the beam 3 carried by the automobile 1 so as to permit the bolts 7 to be passed through the sides for fixedly retaining the frame in engagement with the beam or bar 3.

The straps 8 are positioned so as to fit upon the upper surface and the lower surface of the forwardly-extending bar 4 and after this action, the bolts 9 are passed through these straps for permanently retaining the same in engagement with the bar 4. The forward ends of the straps 8 extend to a point within the frame inasmuch as the straps 8 are placed apart so as to provide sufficient room for the accommodation of the frame as shown clearly in Figs. 1, 2 and 3. A pivot bolt 10 is carried by the forward ends of the straps 8 and therefore passes through the body 5 of the frame so as to carry the spring-actuated stems.

The rearwardly-extending stems 11 have flattened bodies 12 formed thereon through which extend openings 13. The forwardly-extending stem 14 has a yoke 15 formed upon its rear end in which are formed alined openings 16. A bracket 6' is secured by means of rivets 18 to the parallel sides 6 of the body 5 of the frame and the forward end of the stem 4 projects through the bracket 6'. The stems 11 diverge as shown clearly in Fig. 2 and extend rearwardly so as to pass through the body 5 of the frame. The bodies 12 of the stems 11 fit upon each other so as to be embraced by the yoke 15 of the stem 14. At this time the openings 13 and 16 will register so as to permit the pivot bolt 10 to extend therethrough for connecting the stems to the pivot bolt as shown in Figs. 3 and 4. The coil springs 17 are mounted upon the stems 11 and 14 and these coil springs bear upon the body 5 of the frame as well as the bracket 6' at their outer ends, while the inner ends of these coil springs bear upon the bodies 12 of the stems 11 and upon the yoke 15 of the stem 14.

When this shock absorber for automobile trailers is in operation it is supported upon the bars 3 and 4 carried by the automobile and the trailer as above specified. As the automobile is started, it is obvious that the pulling strain necessary for starting the trailer 2 will be taken up by the coil springs 17 carried upon the stems 11. This is due to the fact that the straps 8 will drawn the bolt 10 rearwardly and as this action takes place, the stems 11 will move outwardly beyond the outer side surfaces of the body 5 of the frame thereby causing the shock of starting the trailer to be absorbed by the springs 17. After the trailer has started the tension of the springs will gradually return the bolt 10 to almost its normal position, for it is intended that the springs upon the rearwardly-extending diverging stems 11 will absorb the usual jar which takes place when rigid connections are applied to the trailer and automobile.

At the time the automobile stops, it is necessary, of course, to stop the trailer. The straps 8 will urge the bolt 10 forwardly, causing the tension of the spring carried upon the stem 14 to stop the trailer without imparting a jar to the automobile.

It is of course obvious that the openings formed in the body of the frame and also in the bracket 6' must be of sufficient size to permit the stems to move slightly to one side or the other because of the fact that as the bolt 10 is moved in different directions, the pivot points of the stems will be changed and, as a consequence, sufficient space must be provided for permitting their reciprocation of the sliding movement upon the frame or bracket. As this action takes place, the resiliency of the springs will absorb the shock caused by the starting or stopping of the trailer and it will, therefore, be seen that a simple and efficient shock absorber has been provided for automobile trailers which will prevent injury to the trailer or to the automobile, and will also eliminate the usual jar caused by the coupling of a trailer to an automobile.

What is claimed is:—

1. In a device of the class described the combination of a pair of bars, said bars being adapted to be carried upon an automobile and upon a trailer, a frame carried by one of said bars, straps carried by the remaining bar, and overhanging said frame, and means yieldably connecting said straps to said frame for drawing upon the straps.

2. In a device of the class described, the combination of a pair of bars, said bars being adapted to be carried upon an automobile and upon a trailer, a frame carried by one of said bars, straps carried by the remaining bar, and spring-pressed plungers reciprocally mounted upon said frame and connected to said straps whereby the shock occasioned by drawing or pushing upon said straps will be absorbed.

3. In a device of the class described, the combination of a plurality of bars, said bars being adapted to be carried upon an automobile and upon a trailer, a frame carried by one of said bars, a strap carried by the remaining bar, a bolt carried by said strap and projecting through said frame, spring-pressed stems pivotally mounted upon said bolt and slidably mounted upon said frame whereby a shock occasioned by pulling upon or pushing said strap will be absorbed.

4. In a device of the class described, the combination of a plurality of bars one of said bars being adapted to be carried upon an automobile, the remaining bar being adapted to be carried upon a trailer, a frame comprising a substantially circular body having forwardly-extending parallel sides, said sides embracing one of said bars, means for retaining said sides in engagement with the last-mentioned bar, a bracket fixedly mounted upon said sides, a pair of straps fixedly mounted upon the remaining bar, the forward ends of said straps passing to a point adjacent the center of said frame, a pivot bolt carried by the forward ends of said straps and projecting through said frame, a plurality of rearwardly-extending diverging stems having flat bodies, a forwardly-extending stem having a yoke formed upon one end thereof, said yoke fitting upon the bodies of the first-mentioned stems, said last-mentioned stem projecting through said bracket, said first-mentioned stems projecting through and being reciprocally mounted upon said body of said frame, coil springs carried upon said stems and bearing at their outer ends upon said body of said frame and upon said bracket and at their inner ends upon the bodies of the first-mentioned stems and upon said yoke for normally retaining said stems in set position, said springs being adapted to yield when a pulling or a pushing pressure is exerted thereon thereby absorbing the shock occasioned by the starting or stopping of a trailer.

In testimony whereof we hereunto affix our signatures.

OSCAR FENT.
MASON RAVENSCROFT.